US006703931B2

(12) United States Patent
Morey et al.

(10) Patent No.: US 6,703,931 B2
(45) Date of Patent: Mar. 9, 2004

(54) MULTIFREQUENCY MONITORING AND/OR ALARM DEVICE AND PROCESS

(75) Inventors: Gilles Morey, Saint-Ismier (FR); Gaston Laurens, Le Cheylas (FR)

(73) Assignee: Atral, Crolles (FR)

( * ) Notice: Subject to any disclaimer, the term of this patent is extended or adjusted under 35 U.S.C. 154(b) by 41 days.

(21) Appl. No.: 09/985,809

(22) Filed: Nov. 6, 2001

(65) Prior Publication Data

US 2002/0057200 A1 May 16, 2002

(30) Foreign Application Priority Data

Nov. 6, 2000 (FR) ........................................... 00 14200

(51) Int. Cl.[7] ............................ G08B 1/08; H04Q 7/00

(52) U.S. Cl. ............................ 340/539.16; 340/539.1; 340/539.17; 340/539.22; 455/154.1; 455/158.3

(58) Field of Search ............................ 340/539, 539.1, 340/539.16, 539.17, 539.22; 455/507, 508, 509, 515, 154.1, 158.3, 222, 227, 228

(56) References Cited

U.S. PATENT DOCUMENTS 4,342,986 A * 8/1982 Buskirk et al. ............. 340/539
4,631,527 A * 12/1986 De Witt et al. ............. 340/539
5,815,802 A * 9/1998 Loechner, II .............. 455/67.1

FOREIGN PATENT DOCUMENTS

EP 0 811 959 A1 12/1997
EP 0 834 846 A2 4/1998

* cited by examiner

*Primary Examiner*—Donnie L. Crosland
(74) *Attorney, Agent, or Firm*—Young & Thompson

(57) ABSTRACT

Monitoring and/or alarm device and process including a central unit, at least one intrusion detection peripheral facility, signalling elements and radio link elements allowing radio links on several redundant channels between the central unit and at least one intrusion detection peripheral facility, via which channels this peripheral facility is able to transmit signals to this central unit and wherein elements check the capacity or availability of each of the link channels to transmit the expected signals, elements count the number of available channels and/or the number of unavailable channels and transmission elements transmit to the signalling elements a control signal corresponding to the number of available channels and/or to the number of unavailable channels so as to selectively activate these signalling elements as a function of the state of the control signal.

20 Claims, 2 Drawing Sheets

MULTIFREQUENCY MONITORING AND/OR ALARM DEVICE AND PROCESS

BACKGROUND OF THE INVENTION

The present invention relates to a monitoring and/or alarm device and process, in particular for the monitoring and protection of goods, premises or persons, comprising a central unit, at least one peripheral facility allowing the detection of an intrusion and alarm signalling means.

DESCRIPTION OF THE RELATED ART

Security systems are generally classified into two main categories, wire-based systems and systems comprising radio link means. The latter have numerous advantages as compared with the wire-based systems and in particular they allow easy installation of the peripheral facilities of the central unit even in locations which wire-based systems have difficulty in accessing, thus allowing better monitoring coverage and thereby better protection.

However, these wireless systems also possess drawbacks related to the use of radio channels which may intentionally or unintentionally be partially occupied, completely or partially preventing the transmission of information between the peripheral facility and the central unit.

To solve this problem, Patent EP-A-0 811 959 proposes that several radio link channels be implemented, that the availability of these channels be analysed and that the information be transmitted via the available channel.

Manufacturers of alarm equipment have moreover designed systems with several frequencies or radio channels which are relatively far apart, allowing the information emanating from the peripheral facilities to be transmitted to the central unit even if one of the frequencies is jammed by an outside signal.

However, in case of simultaneous jamming of all the frequencies, the link between the peripheral facilities and the central unit is no longer ensured, thereby rendering the alarm system inoperative if the loss of link is not detected or causing the alarm to trigger if the complete loss of link is detected. In either case, the alarm system does not fulfil its main function which is to signal the presence of an intruder in a monitored zone.

SUMMARY OF THE INVENTION

The object of the invention is to provide an improvement to wireless monitoring and/or alarm systems taking account of the above drawbacks.

Accordingly, the present invention firstly proposes a monitoring and/or alarm device comprising a central unit, at least one intrusion detection peripheral facility, signalling means and radio link means allowing radio links on several redundant channels between the central unit, and at least one intrusion detection peripheral facility, via which channels this peripheral facility is able to transmit signals to this central unit which are expected by the latter.

According to the invention, the device comprises:

- means for checking the capacity or availability of each of the said link channels to transmit the said expected signals,
- means for counting the number of available channels and/or the number of unavailable channels,
- and transmission means for transmitting to the said signalling means a control signal corresponding to the number of available channels and/or to the number of unavailable channels so as to selectively activate these signalling means as a function of the state of the said control signal.

According to the invention, the said signalling means preferably comprise means for being placed or activated according to at least two different modes of operation as a function of at least two states of the said control signal.

According to the invention, the said signalling means are preferably audible, luminous or electrical means.

According to the invention, the said means for checking the availability of each of the said link channels comprise means for measuring the noise level in each of the said channels and means for checking the presence of an expected signal originating from a peripheral facility.

According to the invention, the said transmission means preferably deliver the said control signal each time the number of available and/or unavailable channels is modified during at least one specified duration.

According to the invention, the said signalling means preferably comprise means for being placed or activated according to different modes of operation according to whether the said transmission means transmit the said control signal or a signal corresponding to an intrusion detection.

The present invention also proposes a monitoring and/or alarm process comprising a central unit, at least one intrusion detection peripheral facility, signalling means and radio link means allowing radio links on several redundant channels between the central unit and at least one intrusion detection peripheral facility, via which this facility is able to transmit signals to this central unit which are expected by the latter.

According to the invention, the process consists:

- in checking the capacity or availability of each of the said link channels to transmit the said expected signals,
- in counting the number of available channels and/or the number of unavailable channels,
- and in transmitting to the said signalling means a control signal corresponding to the said number of available channels and/or to the said number of unavailable channels so as to selectively activate these signalling means as a function of the state of the said control signal.

According to the invention, the process preferably consists in placing or activating the said signalling means according to at least two different modes of operation as a function of at least two states of the said control signal.

According to the invention, the process preferably consists:

- in measuring the noise level in each of the said channels
- and in checking the presence of an expected signal originating from a peripheral facility.

According to the invention, the process preferably consists in delivering the said control signal each time the number of available and/or unavailable channels is modified during at least one specified duration.

According to the invention, the process preferably consists in placing or activating the said signalling means according to different modes of operation according to whether the said transmission means transmit the said control signal or a signal corresponding to an intrusion detection.

BRIEF DESCRIPTION OF THE DRAWINGS

The present invention will be better understood by studying a monitoring and/or alarm device and its mode of operation, which are described by way of non-limiting examples illustrated by the drawing in which.

DESCRIPTION OF THE PREFERRED EMBODIMENTS

Figure 1:
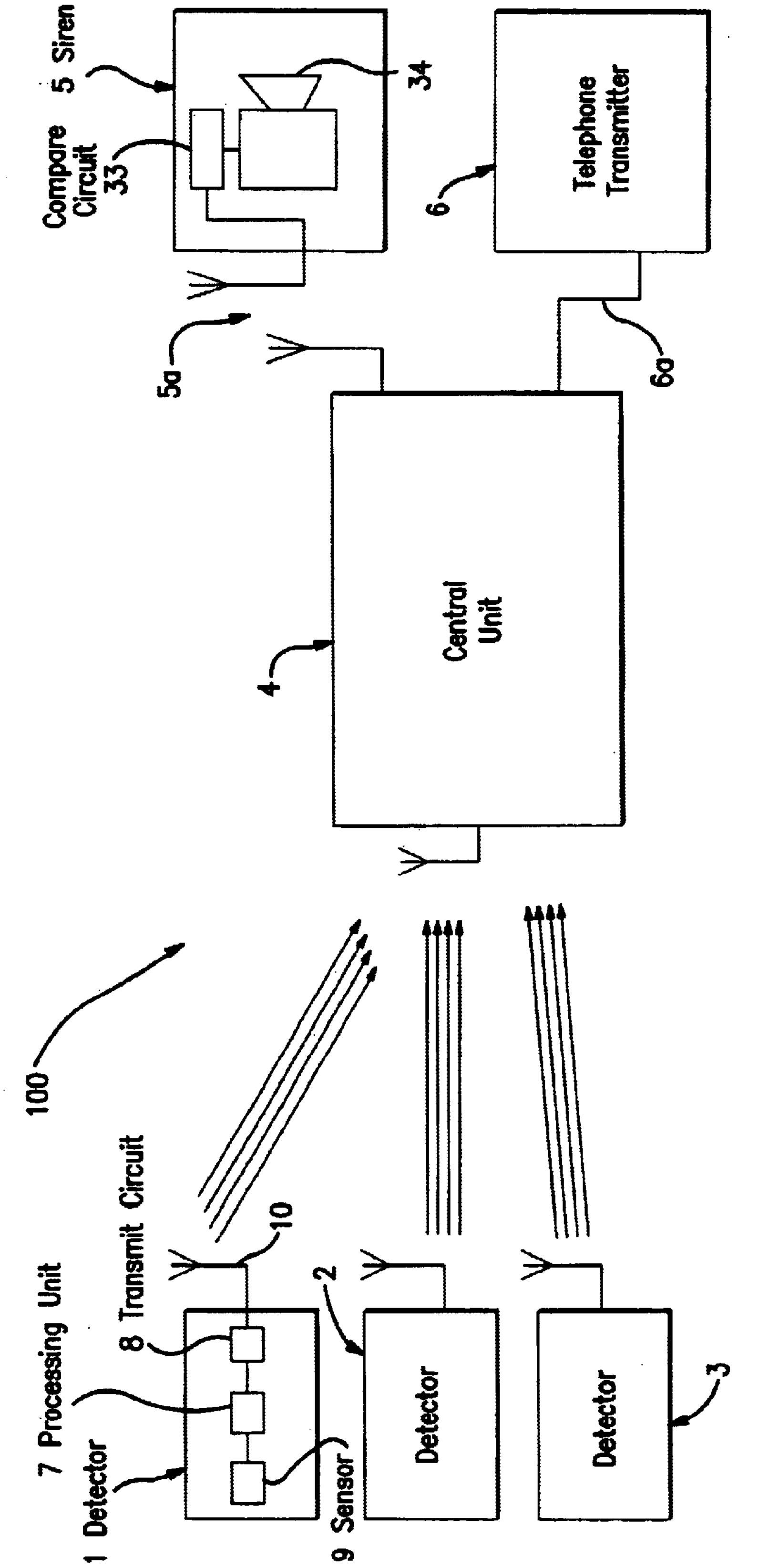
FIG. 1 represents a general diagram of a monitoring and/or alarm device according to the invention.

Referring to FIG. 1, represented therein is a monitoring and/or alarm device 100 which comprises three intrusion detection peripheral facilities 1, 2 and 3 consisting preferably of volumetric detectors or pointwise detectors, communicating with a central unit 4 on four independent radio link channels f1, f2, f3 and f4.

The central unit 4 communicates via a radio link 5*a* with a siren 5 and via a wire path 6*a* with a telephone transmitter 6.

The peripheral detection facility 1 comprises, like the other facilities 2 and 3, a processing unit 7 linked to a transmit circuit 8 and to at least one sensor 9, as well as an antenna 10 connected to the output of the transmit circuit 8.

According to a preferred mode of execution known per se, this peripheral facility 1 operates in the following manner.

The processing unit 7 processes the data emanating from the sensor or sensors 9 and orders the despatch to the central unit 4 by way of the transmit circuit 8 and of the antenna 10 of a message or signal corresponding to the data emanating from the sensors.

This message may be an intrusion signalling message or autoprotection signalling message in the case in particular of an attempt to open the housing of the peripheral facility but also a message indicating a state of this facility, in particular a fault with its electrical power supply.

The message despatched by each peripheral facility to the central unit 4 can also comprise an identity code for this peripheral facility, in such a way that the central unit 4 which stores all the codes of the peripheral detection facilities in a memory accepts only the messages of peripheral facilities for which it is programmed.

In a manner known per se, the transmit circuit 8 of the peripheral facilities mainly comprises oscillators for generating various carrier frequencies each corresponding to a radio link channel. Each carrier frequency is mixed in a mixer comprising an input for the carrier frequency and an input for the message to be transmitted to the central unit 4.

For each peripheral facility 1, 2 and 3, the various carrier frequencies are thus modulated by the same message so as to obtain at the output of their transmit circuit a redundant message on the number of chosen channels. The modulation, known per se, is preferably an amplitude modulation.

In the device of FIG. 1, the message to be transmitted is mixed with four carrier frequencies so as to achieve the transmission of signals preferably centred on the frequencies of 433.20, 434.32, 868.30 and 869 MHz.

Figure 2:
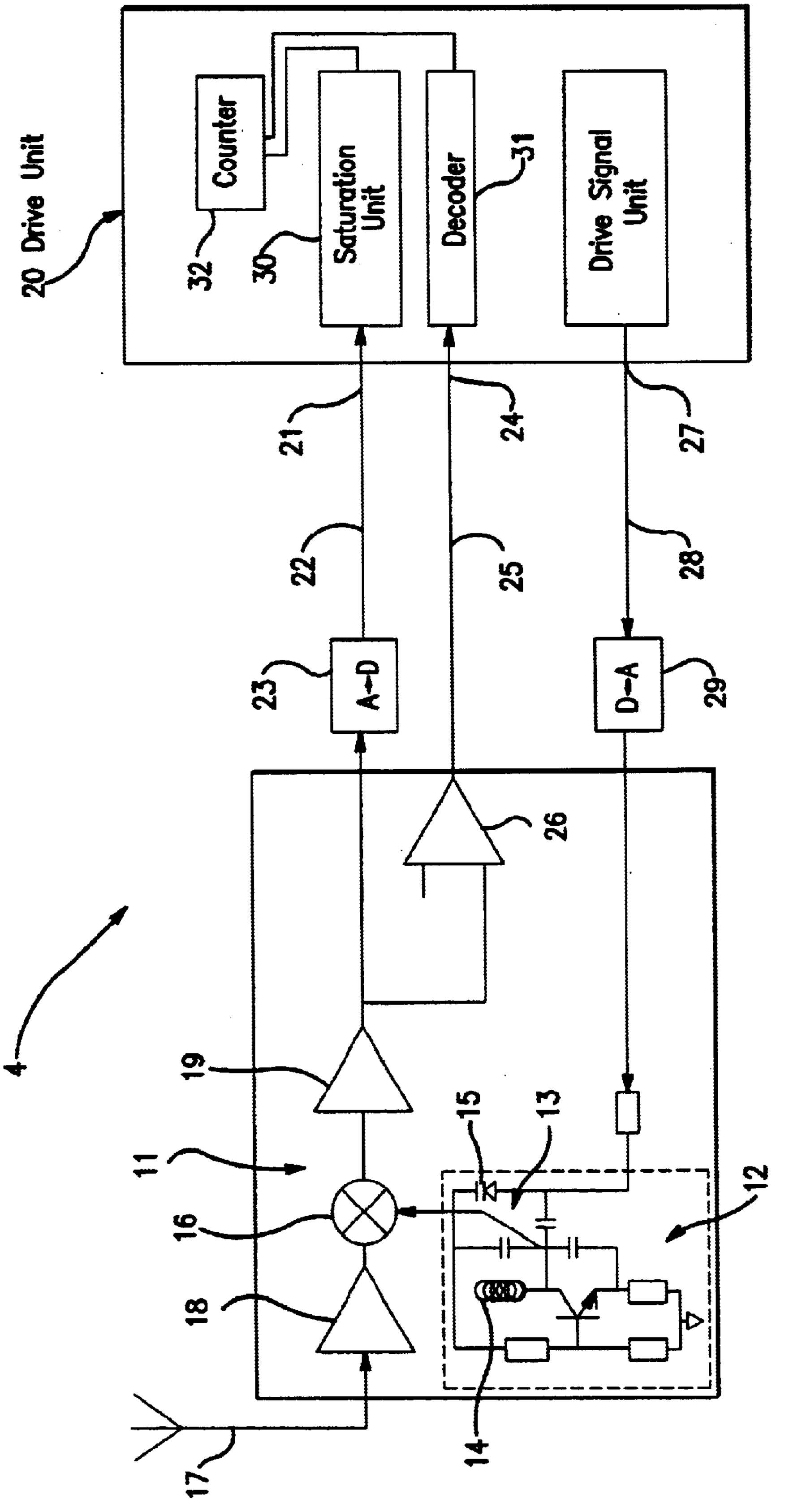
FIG. 2 represents a detailed view of a central unit of this device.

Referring to FIG. 2, represented therein is a detailed view of the central unit 4 including a superheterodyne receiver 11 comprising a local oscillator 12, this oscillator comprising a stopper circuit 13 consisting of a choke 14 arranged in parallel with an arrangement of capacitors.

In a manner known per se, the frequency of oscillation of the local oscillator 12 is determined mainly by the characteristics of the stopper circuit 13. In order to be able to vary this frequency of oscillation, the arrangement of capacitors comprises a voltage-controlled variable-capacitance capacitor 15.

The superheterodyne receiver 11 also comprises a mixer 16 whose two inputs are linked to the local oscillator 12 and to a reception antenna 17 by way of an input amplifier 18 and an output linked to a signal amplifier 19.

The central unit also comprises an electronic signal processing and drive unit 20.

The electronic unit 20 comprises an input 21 to which is wired the line 22 emanating from an analog/digital converter 23 whose input is linked to the output of the amplifier 19, as well as an input 24 to which is wired the output line 25 emanating from a comparator 26, one input of which is linked to the output of the amplifier 19 and the other input to a reference signal S constituting a threshold S.

The electronic unit 20 furthermore comprises an output 27 to which is wired a line 28 connected to the input of a digital/analogue converter 29 whose output is linked to the variable-capacitance capacitor 15.

Referring to FIGS. 1 and 2, the superheterodyne receiver 11 and the electronic unit 20 operate in the following preferred manner.

The electronic unit 20 is programmed to deliver via drive signal unit 35 and the line 28 a drive signal to the digital/analogue converter 29 whose output imposes a specified voltage on the capacitor 15, thus fixing a frequency of oscillation of the local oscillator 12. This controlled frequency of oscillation allows the superheterodyne receiver to receive an outside signal on a first reception channel which corresponds to a transmit channel of one of the peripheral facilities 1, 2 and 3.

At programmed intervals, the electronic unit 20 thus delivers different drive signals in such a way as to modify the frequency of oscillation of the local oscillator 12 so as to investigate various link channels corresponding to the various transmit channels of the peripheral facilities 1, 2 and 3.

According to a preferred embodiment, the manner of operation during the reception by the central unit 4 of an expected signal transmitted by a peripheral facility 1, 2 or 3 is as follows.

The signal transmitted by a peripheral facility on one of the four channels is received by the antenna 17. It is mixed with the signal at the corresponding frequency of oscillation originating from the local oscillator 12, in the mixer 16, in such a way as to demodulate the signal received and to retrieve the message transmitted by the peripheral facility in question.

The signal obtained at the output of the mixer 16 is amplified by the amplifier 19 and the signal obtained at the output of this amplifier is digitized through the converter 23 then directed via the line 22 to the input 21 of the electronic unit. This input 21 is linked to a saturation level unit 30 of this electronic unit.

The signal obtained at the output of the amplifier 19 is compared with the threshold S in the comparator 26. The result of this comparison is introduced, via its input 24 into a decoding unit 31 of the electronic unit 20. This decoding unit analyses the signal emanating from the comparator 26.

Once the entire expected signal transmitted by the peripheral facility in question has been received by the receiver 11, the electronic unit 20 again delivers drive signals so that the receiver 11 successively investigates the other link channels.

Following reception of the said expected signal, the electronic unit 20 generates one or more instruction signals dependent on the result of the content of the signal received, which corresponds to the expected message transmitted by the corresponding peripheral facility. These instruction signals may contain alarm triggering commands directed to the siren 5 and/or to the telephone transmitter 6 or warning commands relating to the state of the peripheral facility.

According to a preferred embodiment, the manner of operation during the reception of a spurious or saturation signal is as follows.

Depending on the nature of the signal which it receives, the decoding unit 31 can detect the fact that the said received signal is not an expected signal transmitted by one of the peripheral facilities 1, 2 or 3 but a spurious or saturating signal. This observation may result in particular from an analysis of the format of the signal received if the latter for example is longer than a signal originating from a peripheral facility, of the actual content of the message, in particular of the absence of an identification code built into the message.

In this case, the decoding unit 31 generates a first information signal SI1 indicating that the signal received on the receiving channel analysed is a spurious signal.

When the saturation unit 30 observes that the level of the signal received is greater than a predetermined, possibly variable, threshold Ss, this unit generates a second information signal SI2.

Insofar as the information signal SI1 and the information signal SI2 are present at the input of a counter 32 which the electronic unit 20 contains, this counter 32 records the fact that the receiving channel analysed is not available.

The counter 32 therefore records the link channels, between the peripheral facilities 1, 2 and 3 and the central unit 4 which are unavailable and increments itself by one unit when a channel becomes unavailable and decrements itself by one unit when a channel becomes reavailable.

Of course, once the decoding unit 31 detects that the signal received by the antenna 17 is a spurious or saturating signal, the electronic unit 20 again delivers drive signals so that the receiver 11 again begins to investigate the various reception channels.

When the number of unavailable channels varies, the central unit 4 is programmed to transmit, by radio to the siren 5 and by wire to the telephone transmitter 6, a control signal Sc whose content corresponds to the number of unavailable channels and/or available channels which are recorded in the counter 32.

The siren 5 comprises an electronic circuit 33 in which the control signal Sc received thereby is compared with reference signals of a register, each of these signals corresponding to a particular mode of operation, that is to say to a particular audible signal to be transmitted.

Thus, in a manner predetermined by programming, the siren 5 may possibly be activated, according to audible modes of operation which are adapted as a function of the number of link channels available or unavailable between the detection facilities 1, 2 and 3 and the central unit 4.

In an exemplary embodiment, if no, one or two link channels are unavailable, the audible facility 34 of the siren 5 is not activated. If three transmission channels are unavailable at the same time, the electronic circuit 33 orders the audible facility 34 to emit spaced warning beeps for a specified duration. If the four transmission channels are unavailable at the same time, then the electronic circuit 33 orders the audible facility 34 to emit a louder sound constituting an alarm.

In an equivalent manner, the telephone transmitter 6 can comprise an electronic circuit designed and programmed in such a way as to generate control and telephone information signals adapted to the control signal Sc which it receives.

In a variant, the electronic unit 20 records in the counter 32 that a link channel is unavailable only when this channel receives a saturating signal or only when the level of saturation of the channel is greater than a threshold for a number of investigatory cycles corresponding to a specified duration.

In a variant, the central unit 4 can comprise as many receivers as channels to be investigated enabling the state of saturation of each channel to be ascertained simultaneously.

In a variant, the electronic unit 20, at least as regards its part for monitoring the availability of the link channels could be built into the signalling means such as the siren 5 or the telephone transmitter 6, by for example being physically linked or built into the electronic circuit 33 of the siren 5.

In a variant, the structure of the receiver used of the central unit 4 may be different. It is in fact conceivable to use other types of receivers and in particular receivers of super-regenerative or homodyne type.

In a variant, each peripheral facility could exhibit its own link channels different from those of the others.

The present invention is not limited to the embodiments described above. It extends to all variants coming within the scope of the appended claims.

What is claimed is:

1. Monitoring and/or alarm device comprising:

a central unit, at least one intrusion detection peripheral facility, a signalling element with a radio link allowing radio links on several redundant link channels, means (20) for checking a capacity or availability of each of the link channels and of said at least one intrusion detection peripheral facility, wherein, said peripheral facility is able to transmit signals, via the link channels, to said central unit, and the central unit comprises means (32) for counting a number of link channels available to transmit the signals and/or a number of unavailable link channels, and transmission means for transmitting to the said signalling element (5) a control signal corresponding to the number of available channels and/or to the number of unavailable channels so as to selectively activate the signalling element as a function of the state of the control signal.

2. Monitoring and/or alarm device according to claim 1, characterized in that said signalling element (5) comprises means for being activated according to at least two different modes of operation as a function of at least two states of the said control signal.

3. Monitoring and/or alarm device according to claim 1, characterized in that said signalling element (5) comprises audible, luminous or electrical means.

4. Monitoring and/or alarm device according to claim 1, characterized in that the means (20) for checking the availability of each of said link channels comprise means for measuring a noise level in each of said channels and means for checking a presence of an expected signal originating from a peripheral facility (1).

5. Monitoring and/or alarm device according to claim 1, characterized in that said transmission means **(5*a*, 6*a*)** deliver said control signal each time the number of available and/or unavailable channels is modified during at least one specified duration.

6. Monitoring and/or alarm device according to claim 1, characterized in that said signalling element (5) comprises means (33) for being activated into different modes of operation according to whether said transmission means transmit said control signal or a signal corresponding to an intrusion detection.

7. Monitoring and/or alarm process utilizing a central unit, at least one intrusion detection peripheral facility, a signalling element with a radio link allowing radio links on several redundant link channels between the central unit and the at least one intrusion detection peripheral facility, said peripheral facility able to transmit signals to the central unit based on a verified capacity or availability of each of said link channels comprising the steps of:

counting a number of available link channels to transmit the signals and/or a number of unavailable link channels, and transmitting to said signalling element a control signal corresponding to said number of available channels and/or to said number of unavailable channels so as to selectively activate said signalling element as a function of a state of said control signal.

8. Monitoring and/or alarm process according to claim 7, comprising the further step of activating said signalling element according to at least two different modes of operation as a function of at least two states of said control signal.

9. Monitoring and/or alarm process according to claim 7, comprising the further step of measuring a noise level in each of said link channels and checking the presence of an expected signal originating from a peripheral facility.

10. Monitoring and/or alarm process according to claim 7, comprising the further step of delivering said control signal each time the number of available and/or unavailable channels is modified during at least one specified duration.

11. Monitoring and/or alarm process according to claim 7, comprising the further step of activating said signalling element, into different modes of operation according to whether said transmission step transmits said control signal or a signal corresponding to an intrusion detection.

12. A monitoring device, comprising:

a central unit (4);

at least one intrusion detector (1, 2, 3); and a signalling element (5) allowing radio links to the central unit on several redundant link channels;

the central unit comprising a means for counting a number of link channels available to transmit the signals, and transmission means for transmitting to the signalling element a control signal corresponding to the number of link channels available to transmit the signals so as to selectively activate the signalling element as a function of a state of the said control signal.

13. The monitoring device of claim 12, further comprising a means for checking an availability of the at least one intrusion detector, and wherein the at least one intrusion detector is able to transmit signals to the central unit via available link channels.

14. The monitoring device of claim 13, wherein, the signalling element comprises means for being activated according to at least two different modes of operation as a function of at least two states of the control signal.

15. The monitoring device of claim 13, wherein, the signalling element is an audible and a luminous signalling part.

16. The monitoring device of claim 12, wherein the central unit further comprising:

means for checking means for measuring a noise level in each of the link channels; and means for checking a presence of an expected signal originating from the at least one intrusion detector.

17. The monitoring device of claim 12, wherein, the transmission means deliver the control signal each time the number of available link channels is modified during at least one specified time duration.

18. The monitoring device of claim 12, wherein the signalling element comprises means for being activated into different modes of operation according to whether the transmission means transmit the control signal or a signal corresponding to an intrusion detection.

19. The monitoring system of claim 12, further comprising means for checking the availability of the at least one intrusion detector.

20. The monitoring system of claim 12, comprising plural of the intrusion detector, each of the plural intrusion detectors able to transmit signals to the central unit via available link channels.

* * * * *